United States Patent
Muthiah

(10) Patent No.: US 11,513,723 B2
(45) Date of Patent: Nov. 29, 2022

(54) READ HANDLING IN ZONED NAMESPACE DEVICES

(71) Applicant: WESTERN DIGITAL TECHNOLOGIES, INC., San Jose, CA (US)

(72) Inventor: Ramanathan Muthiah, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 2 days.

(21) Appl. No.: 17/180,631

(22) Filed: Feb. 19, 2021

(65) Prior Publication Data

US 2022/0083256 A1    Mar. 17, 2022

Related U.S. Application Data

(60) Provisional application No. 63/079,898, filed on Sep. 17, 2020.

(51) Int. Cl.
   *G06F 3/00*    (2006.01)
   *G06F 3/06*    (2006.01)

(52) U.S. Cl.
   CPC .......... *G06F 3/0655* (2013.01); *G06F 3/0604* (2013.01); *G06F 3/0629* (2013.01); *G06F 3/0679* (2013.01)

(58) Field of Classification Search
   None
   See application file for complete search history.

(56) References Cited

U.S. PATENT DOCUMENTS

| | | | |
|---|---|---|---|
| 7,408,834 B2 | 8/2008 | Conley et al. | |
| 7,451,225 B1 * | 11/2008 | Todd | H04L 67/2852 711/E12.075 |
| 10,025,532 B2 | 7/2018 | Manohar et al. | |
| 2003/0200386 A1 | 10/2003 | Hertz et al. | |
| 2018/0321987 A1 | 11/2018 | Benisty | |
| 2019/0369912 A1 | 12/2019 | Steinmetz | |
| 2021/0004160 A1 * | 1/2021 | Shasha | G06F 3/067 |

* cited by examiner

*Primary Examiner* — Midys Rojas
(74) *Attorney, Agent, or Firm* — ArentFox Schiff LLP

(57) ABSTRACT

Aspects of a storage device including a memory and a controller are provided which optimize read look ahead (RLA) performance based on zone configurations or stored metadata. The controller stores in memory information previously received from a host, including a zone configuration or other information from which metadata associated with subsequent data to be pre-fetched in RLA may be determined. When the stored information includes the zone configuration, the controller reads data from memory in response to a host command and limits pre-fetching of subsequent data from the memory based on the zone configuration. When the stored information includes metadata, the controller reads the metadata associated with subsequent data from the memory, and limits pre-fetching of the subsequent data based on the metadata. Thus, resources of the storage device that are typically used for RLA may instead be used for other operations, improving the efficiency of the storage device.

17 Claims, 9 Drawing Sheets

READ HANDLING IN ZONED NAMESPACE DEVICES

CROSS-REFERENCE TO RELATED APPLICATION

This application claims the benefit of, and right of priority to, U.S. Provisional Patent Application No. 63/079,898, entitled "Read Handling in Zoned Namespace Devices," filed on Sep. 17, 2020, the entire contents of which are herein incorporated by reference as if fully set forth herein.

BACKGROUND

Field

This disclosure is generally related to electronic devices and more particularly to storage devices.

Background

Storage devices enable users to store and retrieve data. Examples of storage devices include non-volatile memory devices. A non-volatile memory (NVM) generally retains data after a power cycle. An example of a non-volatile memory is a flash memory, which may include array(s) of NAND cells on one or more dies. Flash memory may be found in solid-state devices (SSDs), Secure Digital (SD) cards, and the like.

Flash storage devices may operate using a NVM command set and an administrative (admin) command set. The NVM command set may include various commands that the flash storage device may perform with respect to data in the non-volatile memory such as read, write, verify, etc. The admin command set may include various commands that the flash storage device may perform with respect to managing endurance groups, namespaces, or other parameters of the non-volatile memory.

Zoned Namespace (ZNS) is an SSD namespace architecture in which a range of logical addresses in the non-volatile memory (e.g. a zoned namespace) is divided into fixed-sized groups of logical addresses, or zones. Each zone within the zoned namespace is used for a specific application. For example, the host may write data associated with different applications in different zones of the zoned namespace. The flash storage device interfaces with the host to obtain the defined zones, and maps the zones to blocks in the flash memory. Thus, the host may write separate application-related data into separate blocks of flash memory.

In ZNS, the NVM command set and the admin command set may include additional commands that the flash storage device may perform with respect to the zoned namespace, which may together be referred to as a zoned namespace command set. As an example, the zoned namespace command set supports an identify namespace data structure indicating zone operation characteristics, which define the specific behaviors of the zoned namespace. One such characteristic includes a bit or flag indicating whether the flash storage device may perform read operations specifying a range of logical addresses spanning multiple zones (i.e. whether the device can read across zone boundaries). If the flag is set (e.g. a value of '1'), the flash storage device may be permitted to read across zone boundaries, while if the flag is reset or cleared (e.g. a value of '0'), the controller may be prohibited from reading across zone boundaries. The host may provide this flag to the flash storage device in the identify namespace data structure (or in some other zone configuration), which may be stored in a configuration register of the flash storage device.

SUMMARY

One aspect of a storage device is disclosed herein. The storage device includes a memory and a controller. The controller is configured to read data from the memory in response to a host command, and to limit pre-fetching of subsequent data from the memory based on stored information previously received from a host.

Another aspect of a storage device is disclosed herein. The storage device includes a memory and a controller. The controller is configured to store in the memory a zone configuration received from a host, to read data from the memory in response to a host command, and to limit pre-fetching of subsequent data from the memory based on the zone configuration.

A further aspect of a storage device is disclosed herein. The storage device includes a memory and a controller. The controller is configured to read data from the memory in response to a host command, to read metadata associated with subsequent data from the memory including information previously indicated by a host, and to limit pre-fetching the subsequent data from the memory based on the information.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
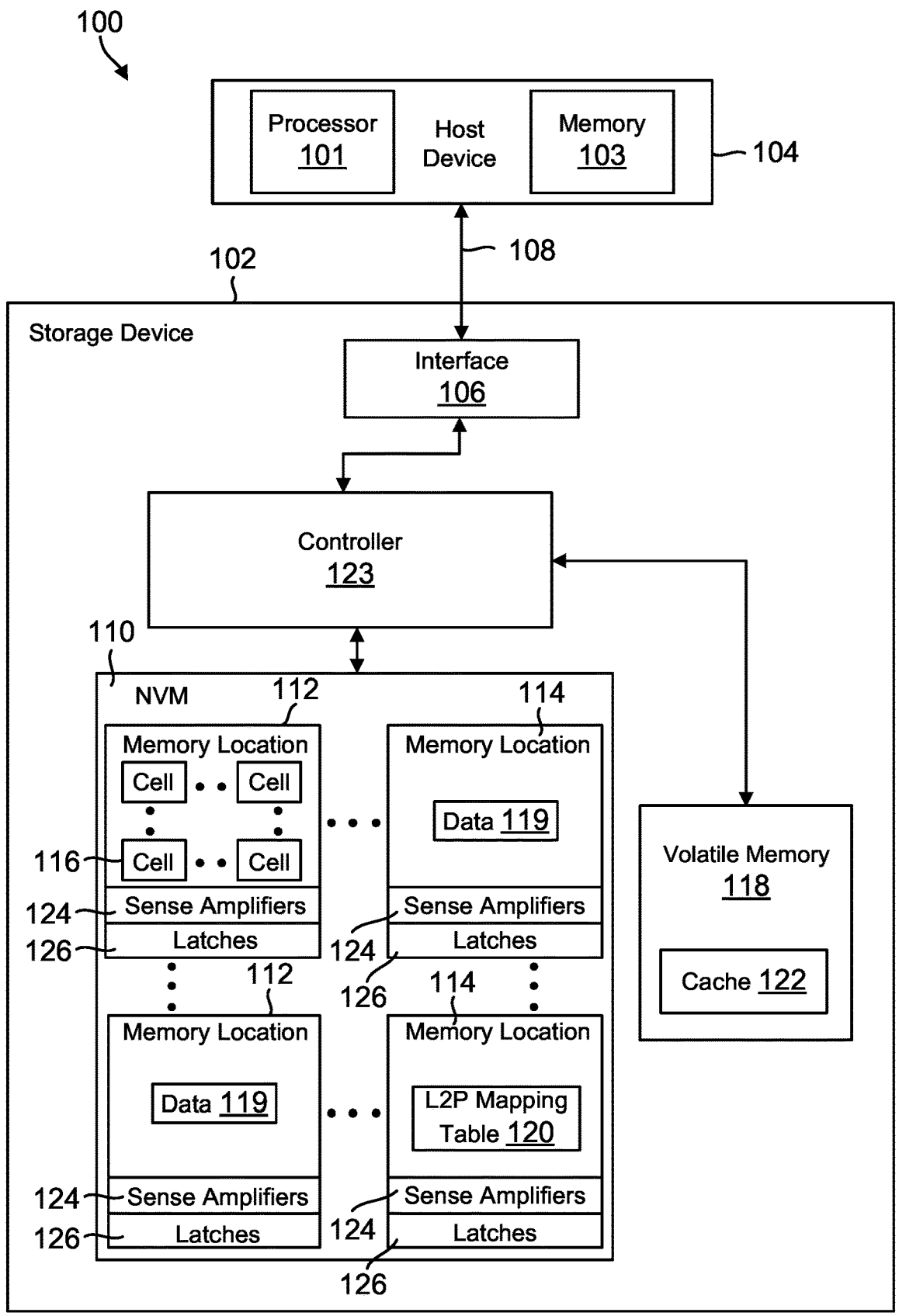
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Typically, in ZNS, a host provides a definition of zones, or groups of logical addresses, to a flash storage device. For example, the host may indicate that one group of LBAs, or one logical block, is associated with a first zone, that another group of LBAs, or another logical block, is associated with a second zone, and so forth. The flash storage device may then map each logical block to one or more physical blocks in the flash memory. For instance, the flash storage device may map the LBAs associated with the first zone to a first physical block, the LBAs associated with the second zone to a second physical block, etc. The flash storage device may then write and read data in the blocks associated with the zones.

When writing data to zones, the flash storage device may first issue a zone write command to initiate writing to a zone, followed by one or more zone append commands to subsequently write to that zone. For example, if the first zone includes LBAs 0-1023 and each LBA represents 512 bytes, the host may initially send a command to the flash storage device to write 256 KB of data in LBAs 0-511 (which the flash storage device executes using a zone write command), and the host may subsequently send one or more commands to the flash storage device to write another 256 KB of data in LBAs 512-1023 (which the flash storage device executes using one or more zone append commands). Similarly, if the second zone includes LBAs 1024-2047, the host may initially request the flash storage device to write 256 KB of data in LBAs 1024-1535, and subsequently to write 256 KB data in LBAs 1536-2047. If the host attempts to overwrite a previously written LBA in a partially written zone (for instance, if the host attempts to write data again to LBAs 0-511 without completing LBAs 512-1023), the flash storage device may abort the command as an invalid write. Thus, the host may be constrained by ZNS to write data sequentially in the defined zones.

Similarly, when reading data in zones, the flash storage device may read the data sequentially in each zone. For example, where the first zone includes LBAs 0-1023 and each LBA represents 512 bytes, the host may similarly send a command to the flash storage device to read 256 KB of data from LBAs 0-511, and the host may subsequently send one or more commands to the flash storage device to read 256 KB of data from LBAs 512-1023. Likewise, where the second zone includes LBAs 1024-2047, the host may initially send a command to the flash storage device to read data from LBAs 1024-1535, and the host may subsequently send one or more commands to the flash storage device to read data from LBAs 1536-2047.

In some cases, the host may request the flash storage device to read data across zone boundaries. In such cases, the flash storage device may check a configuration register to determine whether reading across zone boundaries is permitted or not. For example, the flash storage device may check for a read across zone boundaries bit in a zoned namespace command set specific identify namespace data structure received from the host. Depending on the value of the bit, the flash storage device may permit read operations that specify an LBA range containing logical blocks in more than one zone. For example, where the first zone includes LBAs 0-1023 and the second zone includes LBAs 1024-2047, and the host sends a read command to read data in LBAs 0-1535 (across the boundaries of the first zone and the second zone), the controller may successfully read the data if the read across zone boundaries bit is set (e.g. a value of 1). Otherwise, if the read across zone boundaries bit is reset (e.g. a value of 0), the controller may abort the command as an invalid read with a zone boundary error. Thus, the host may be constrained by ZNS to read data sequentially within a defined zone.

When reading data, the flash storage device may also perform read look ahead (RLA). In RLA, the flash storage device reads data from non-volatile memory prior to receiving from the host a read command for that data, and the flash storage device stores that data into cache or other volatile memory to be accessed if the read command later arrives. Thus, the flash storage device may pre-fetch data from memory when performing RLA. The size of data that is pre-fetched in RLA is traditionally maximized and fixed based on available resources in the flash storage device (e.g. NAND bus size, number of latches, etc.). For example, if the maximum amount of data the flash storage device may pre-fetch at one time is 512 KB based on the available resources, the flash storage device may generally pre-fetch that amount each time RLA is performed.

The data that is pre-fetched in RLA may be predicted or speculated based on a previous read command. For example, if the flash storage device receives a read command from the host for 512 KB of sequential data (e.g. LBAs 0-1023 assuming each LBA represents 512 bytes), the flash storage device may predict that the host will likely issue a read command for another 512 KB of subsequent, sequential data (e.g. LBAs 1024-2047). Therefore, in addition to fetching the first 512 KB of data in response to the read command and providing the data to the host, the flash storage device may pre-fetch the next 512 KB of data and store that data in volatile memory until the device receives a subsequent read command for the pre-fetched data. If the prediction is successful, the flash storage device may quickly provide the data from the volatile memory to the host without tying up resources in the non-volatile memory, thus allowing other background operations such as garbage collection (GC) to be performed in the non-volatile memory in the meanwhile. Successfully predicted RLA may thus save time and resources in the flash storage device. However, if the RLA prediction is not successful (i.e. the host does not issue the read command for the pre-fetched data), the pre-fetched data may be thrashed, and the time spent and resources tied up in the non-volatile memory during the pre-fetching may be inefficiently used or wasted.

Thus, properly predicting data and triggering RLA for such data may significantly benefit the flash storage device. However, when the flash storage device implements ZNS, the traditional approach to RLA described above may result in less successful predictions since traditional RLA is typically performed irrespective of zoned namespace configurations. For example, when the flash storage device receives a read command from a host for data in one zone, the fixed and maximized amount of data typically received in RLA may include data from a different zone, even if the flash storage device previously received a zone configuration prohibiting the host and flash storage device from reading data across zones. For instance, assume a first zone includes LBAs 0-1023 and a second zone includes LBAs 1024-2047. In such case, if the flash storage device receives a read command including LBAs 384-895 (e.g. 256 KB of data) in the first zone and pre-fetches a maximum of 512 KB of subsequent sequential data in RLA (e.g. encompassing LBAs 896-1919), the pre-fetched data may be from both the first zone and the second zone. However, if the read across zone boundaries flag is reset (prohibiting reading across zones), the host cannot send a read command specifying this LBA range since it contains logical blocks in more than one zone, and therefore it is likely that the RLA data may be thrashed in response to a failed prediction.

Accordingly, to optimize RLA and provide a higher likelihood of successful predictions in flash storage devices implementing ZNS, a controller of the flash storage device may limit its pre-fetching of data (e.g. cap its RLA) based on a zone configuration indicated by a host. For example, the zone configuration may include the zoned namespace command set specific identify namespace data structure, including zone operation characteristics such as the read across zone boundaries flag, and the controller may determine whether the read across zone boundaries flag is reset (i.e. that reading across zone boundaries is prohibited). If the controller determines that reading across zone boundaries is prohibited, the controller may next determine whether the current read command from the host includes logical addresses within, but not including the end of, a particular zone. If the logical addresses in the current read command do not encompass the end of the zone (they are within the middle of the zone), the controller may pre-fetch predicted data up until the end of the zone, notwithstanding whether cache and system resources are available for additional pre-fetching of data. If the controller later receives a read command for the pre-fetched data (including logical addresses up to the end of the zone), then the controller may subsequently perform maximum size pre-fetching in RLA based on the available system resources (without limiting RLA).

For instance, in the above example where the first zone includes LBAs 0-1023 and the second zone includes LBAs 1024-2047, the controller may determine that the read across zone boundaries flag is reset and that the current read command includes LBAs 384-895 (e.g. 256 KB of data) in the first zone. In such case, to avoid performing unnecessary RLA in the second zone at this time, the controller may limit pre-fetching of data to LBAs 896-1023 (e.g. 64 KB) ending at the first zone, even if the maximum amount of data that may be RLA at one time is 512 KB such as described above. If the RLA prediction is successful and the controller later receives a subsequent read command for LBAs 896-1023 until the end of the first zone, then the controller may determine there to be a higher likelihood that an additional read command may be received for additional data in the second zone (since there is no more data left to read in the first zone). As a result, the controller may perform RLA for the additional data in the second zone (e.g. LBAs 1024-2047) without limiting the pre-fetching based on the zone configuration. Accordingly, the likelihood of successful RLA predictions in ZNS may increase, and resource usage of the flash storage device may be improved.

In a different example, the controller may determine that the read across zone boundaries flag is set, or that reading across zone boundaries is otherwise permitted. Alternatively, the flash storage device may be a device that does not implement ZNS, and thus may not have any zones. In either example, the controller may attempt to optimize RLA in these situations by limiting the pre-fetching of data (e.g. cap its RLA) based on stored metadata indicating a sequential host write pattern. The stored metadata may be determined by the controller, or in some cases, provided by the host.

In one example, the controller may determine the metadata from a submission queue of write commands from the host, which may include information indicating whether a sequential write pattern in a first write command is continuing or ends in a second write command. For example, the controller may determine from the submission queue that a first write command including LBAs 384-895 associated with 256 KB of sequential data and a second write command including LBAs 896-1023 are pending. The controller may receive the second write command in the submission queue prior to processing and flushing the host data in the first write command to the flash memory. Based on the data lengths and order of the LBAs for these write commands, the controller may identify that the first write command and second write command are sequential in nature (i.e. the second write command for LBAs 896-1023 continues the sequential pattern from the first write command for LBAs 384-895). To remember this information regarding the sequential pattern for RLA, the controller may store the information as metadata associated with the first write command. For example, the controller may tag the metadata in a flash management unit (FMU) header of the written sequential data in the first write command prior to flushing the data into the non-volatile memory, save the metadata in a table or other data structure in the non-volatile memory, or store the metadata in other ways. Later, when the controller receives a read command for the sequential data, the controller may read this metadata along with the sequential data to determine whether and how much RLA or pre-fetching of subsequent data will be required. For example, if the read command includes LBAs 384-895 associated with 256 KB of sequential data and the metadata indicates that the sequential pattern continues for LBAs 896-1023 as described above, the controller may limit pre-fetching of data to LBAs 896-1023 (e.g. 64 KB) based on the metadata, even if the maximum amount of data that may be RLA at one time is 512 KB such as described above. Alternatively, if the metadata indicates that a sequential pattern ends (e.g. the next LBAs are not sequential to the current read command), the controller may not perform RLA, saving time and resources for other background operations such as GC. Accordingly, the resource usage of the flash storage device due to RLA may also be improved for devices that do not implement ZNS or devices that implement ZNS without zone boundary restrictions.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
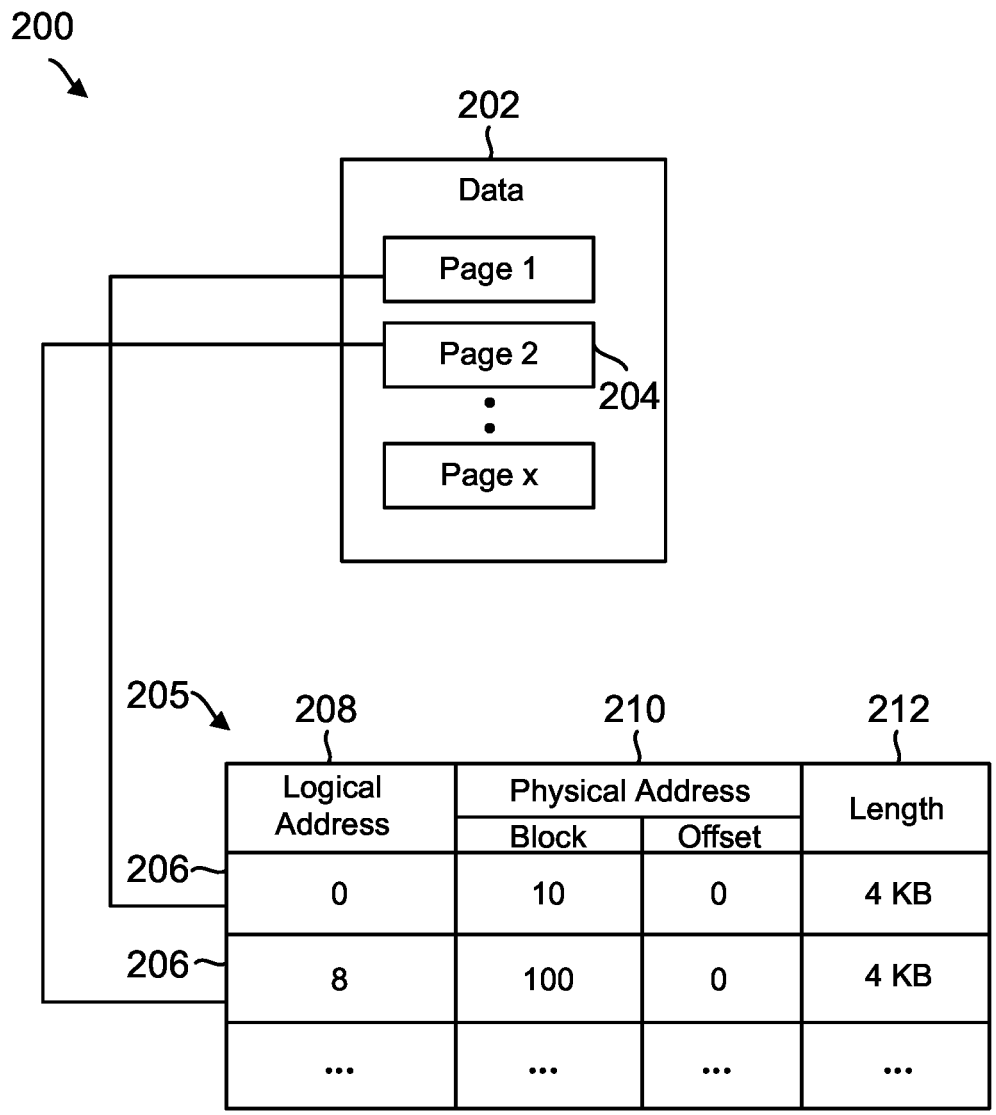
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
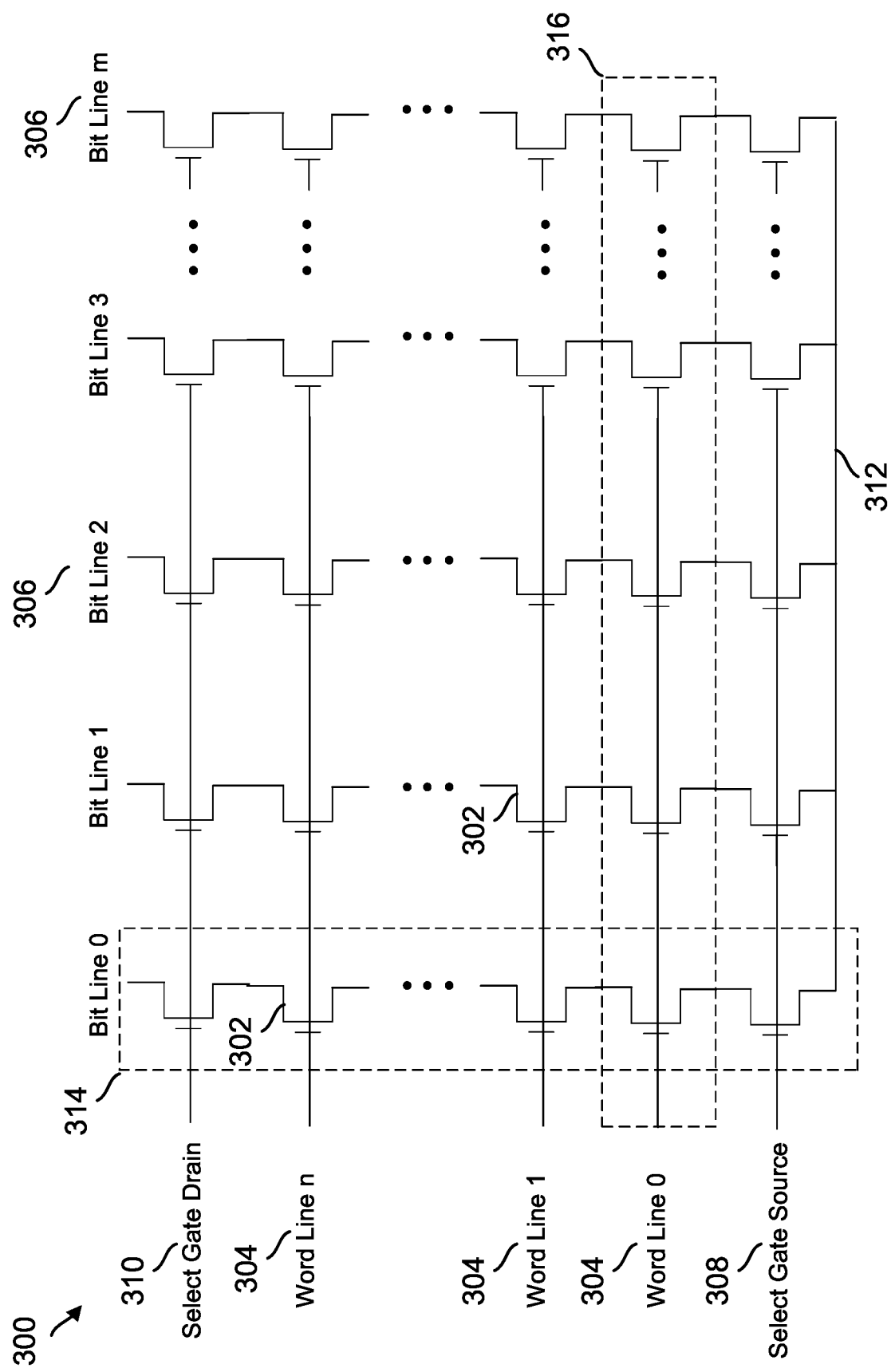
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
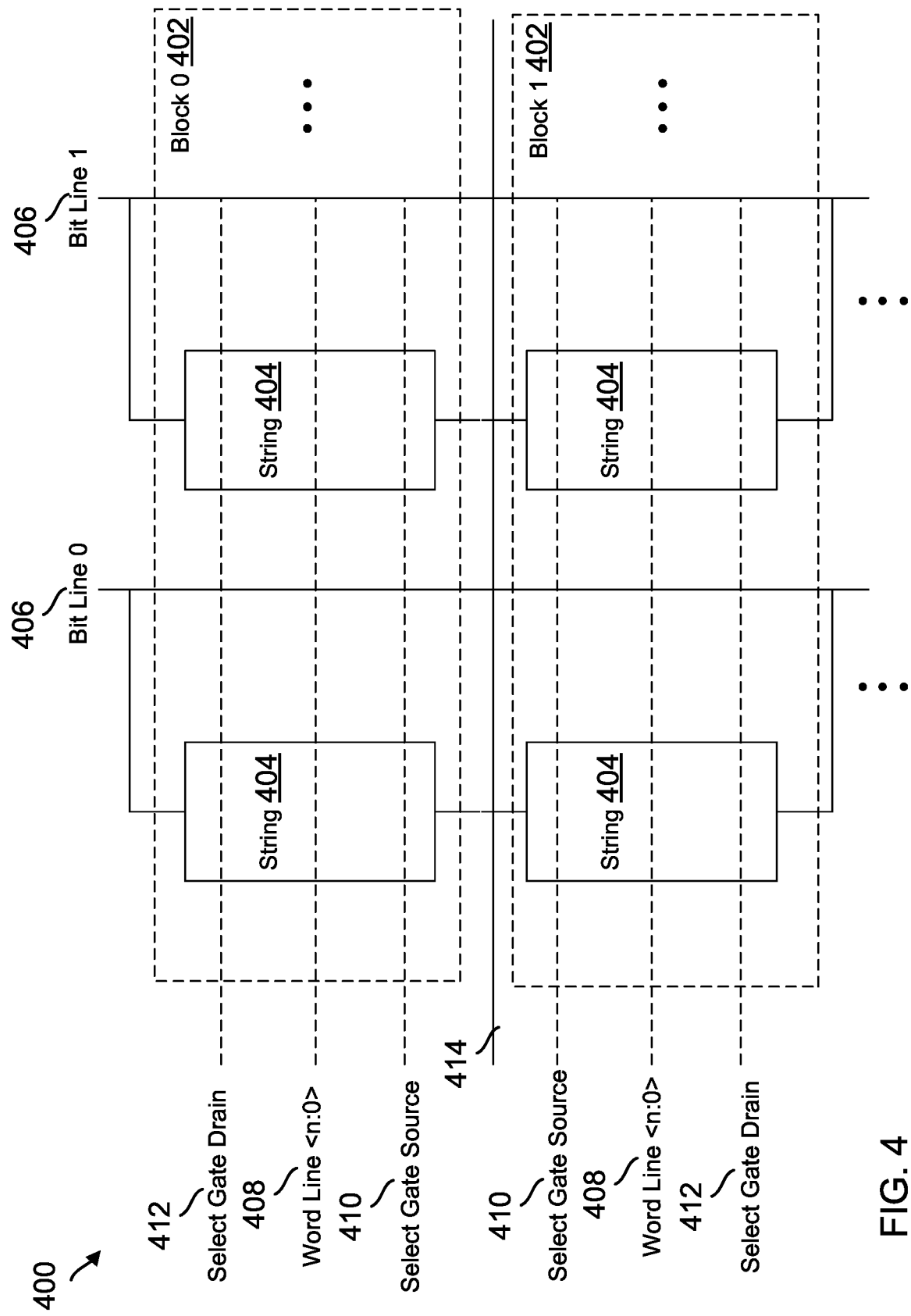
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

The controller 123 may also write and read data in zones configured by the host 104. For example, in ZNS, groups of contiguous, non-overlapping logical addresses (e.g. LBAs 208) may be divided into different zones. The controller may read data from or write data to pages 316 of cells 302 in the blocks 402 corresponding to the logical addresses 208 associated with the different zones.

Figure 5:
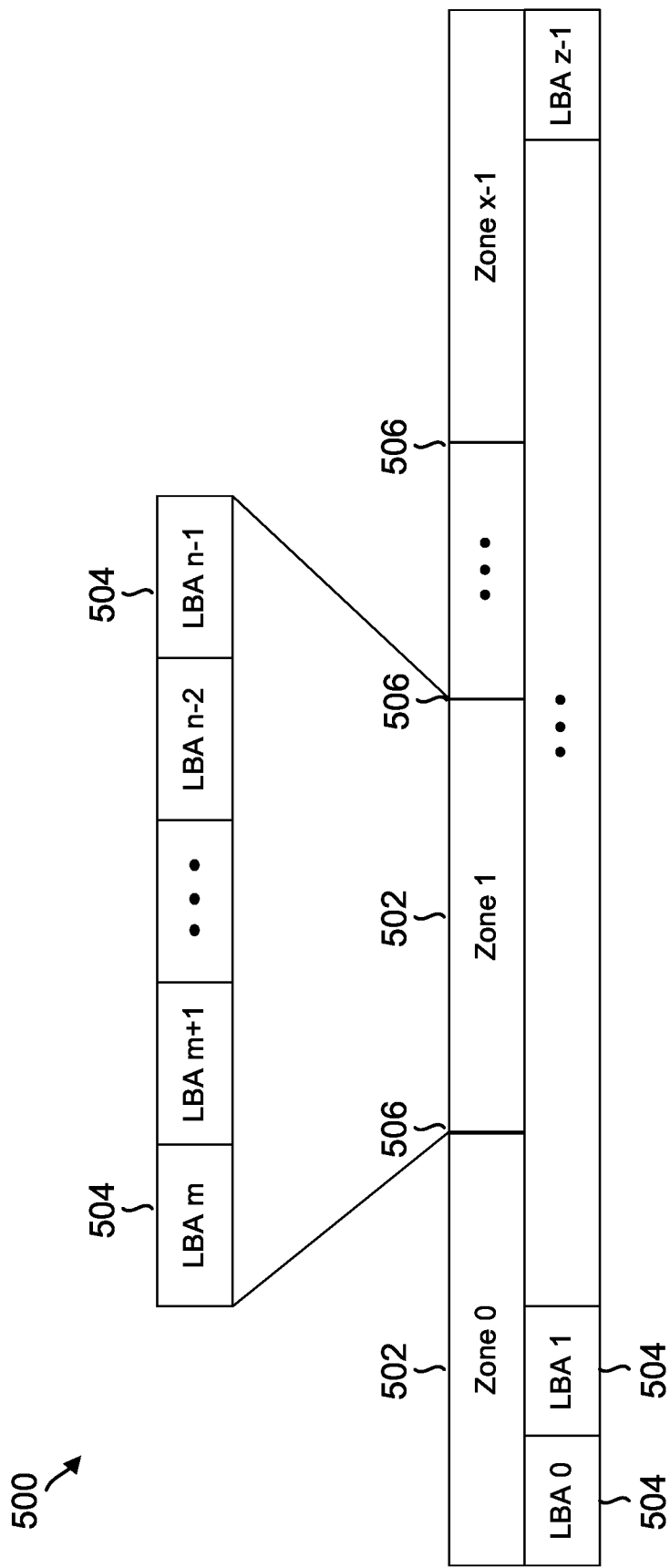
FIG. 5 is a conceptual diagram illustrating an example of an association of zones to groups of logical addresses that is received by the storage device of FIG. 1.

FIG. 5 illustrates a conceptual diagram 500 of an example of zones 502. Each zone 502 is fixed in size and includes a contiguous range of sequential logical addresses 504 in the NVM 110. For instance as illustrated, the NVM 110 may include a total of z LBAs that are divided into x zones, with each zone including a range of n-m sequential LBAs, where z represents the total number of sectors in flash memory, x represents the number of zones, m represents a first LBA in a zone, and n represents a last LBA in the same zone. Each zone may be separately used by the host for storing data associated with one or more applications run by the host. Thus, the host 104 may divide the LBAs into a number of zones depending on the number of applications run by the host.

When writing data to zones 502, the controller 123 may first issue a zone write command to initiate writing to a zone, followed by one or more zone append commands to subsequently write to that zone. For example, if one of the zones 502 includes LBAs 0-1023 and each LBA represents 512 bytes, the host 104 may initially send a command to the controller to write 256 KB of data in LBAs 0-511 (which the controller may execute using a zone write command), and the host may subsequently send one or more commands to the controller to write another 256 KB of data in LBAs 512-1023 (which the controller may execute using one or more zone append commands). Similarly, if another of the zones 502 includes LBAs 1024-2047, the host may initially request the controller to write 256 KB of data in LBAs 1024-1535, and subsequently to write 256 KB data in LBAs 1536-2047. If the host attempts to overwrite a previously written LBA in a partially written zone (for instance, if the host attempts to write data again to LBAs 0-511 without completing LBAs 512-1023), the controller 123 may abort the command as an invalid write. Thus, the host 104 may be constrained by ZNS to write data sequentially in each of the zones 502.

Similarly, when reading data in zones 502, the controller 123 may read the data sequentially in each zone. For example, where one of the zones 502 includes LBAs 0-1023 and each LBA represents 512 bytes, the host 104 may similarly send a command to the controller to read 256 KB of data from LBAs 0-511, and the host may subsequently send one or more commands to the controller to read 256 KB of data from LBAs 512-1023. Likewise, where another of the zones 502 includes LBAs 1024-2047, the host 104 may initially send a command to the controller to read data from LBAs 1024-1535, and the host may subsequently send one or more commands to the controller to read data from LBAs 1536-2047.

The controller 123 may also be configured by the host 104 to read data across zone boundaries 506. For example, the controller may check a configuration register stored in the NVM 110 to determine whether reading across zone boundaries 506 is permitted or not. For example, the controller may check for a read across zone boundaries bit in a zoned namespace command set specific identify namespace data structure received from the host 104. Depending on the value of the bit, the controller 123 may permit read operations that specify an LBA range containing logical blocks in more than one of the zones 502. For example, where one of the zones 502 includes LBAs 0-1023 and another of the zones 502 includes LBAs 1024-2047, and the host 104 sends a read command to read data in LBAs 0-1535 (across the boundary 506 of the respective zones), the controller may successfully read the data if the read across zone boundaries bit is set (e.g. a value of 1). Otherwise, if the read across zone boundaries bit is reset (e.g. a value of 0), the controller may abort the command as an invalid read with a zone boundary error. Thus, the host may be constrained by ZNS to read data sequentially within a defined zone.

When reading data from pages 316 of cells 302 in the blocks 402 of the NVM 110, the controller 123 may also perform RLA. In RLA, the controller may pre-fetch data from the NVM 110 prior to receiving from the host 104 a read command for that data, and the controller 123 may store that pre-fetched data into the cache 122 or other volatile memory (e.g. the volatile memory 118) to be accessed if the read command later arrives. The size of data that is pre-fetched in RLA is traditionally maximized and fixed based on available resources in the storage device 102 (e.g. NAND bus size, number of latches, etc.). For example, if the maximum amount of data the controller may pre-fetch at one time is 512 KB based on the available resources, the controller may traditionally pre-fetch that amount each time RLA is performed.

Figure 6:
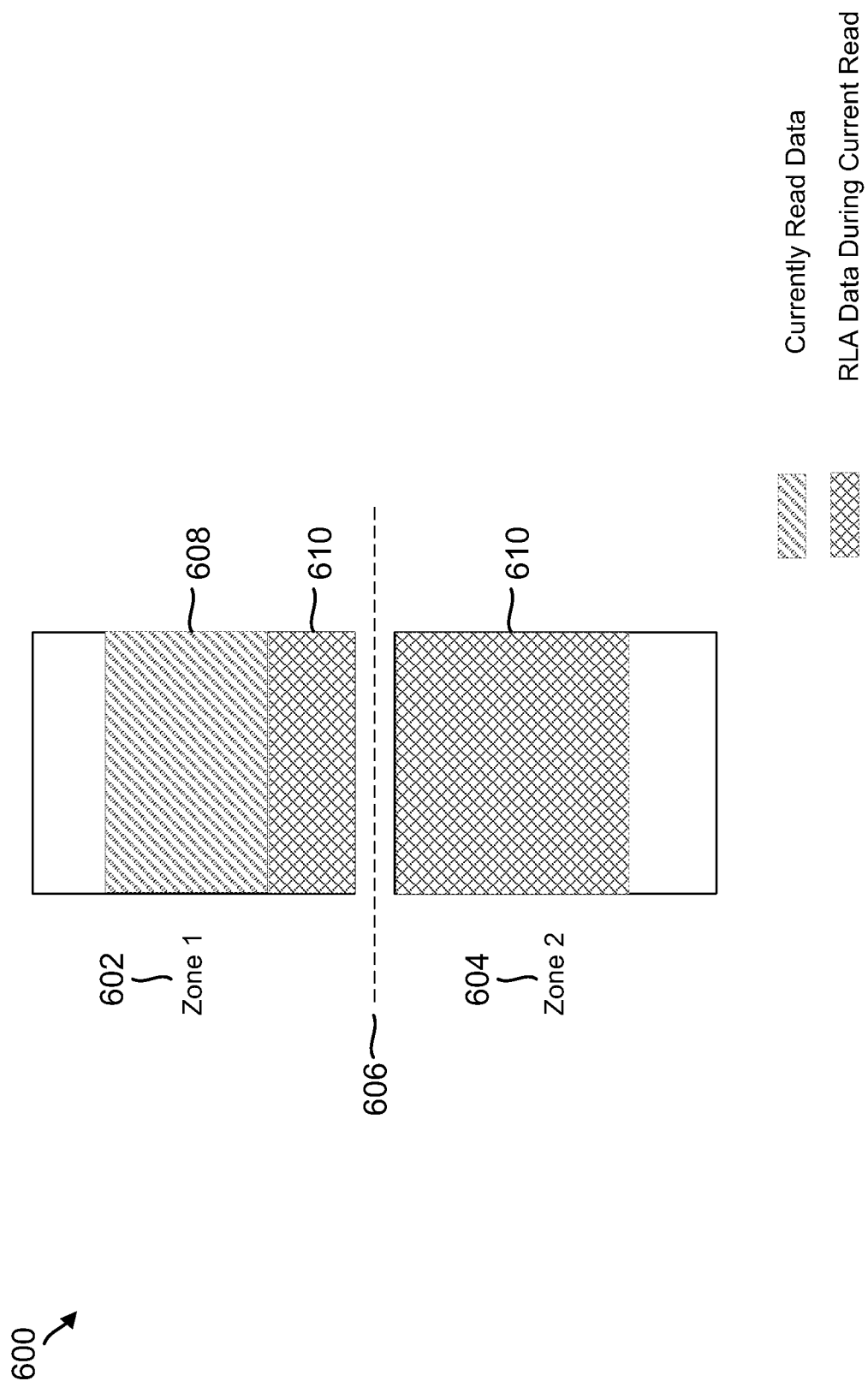
FIG. 6 is a conceptual diagram illustrating an example of traditional read look ahead performance.

FIG. 6 depicts an example diagram 600 illustrating traditional RLA performance when the NVM 110 is divided into zones, including a first zone 602 and a second zone 604 separated by a zone boundary 606. First zone 602 and second zone 604 may each correspond to one of the zones 502 in FIG. 5, and zone boundary 606 may correspond to one of the zone boundaries 506 in FIG. 5. In the example of FIG. 6, the controller 123 receives a read command from host 104 including logical addresses in the first zone 602, and the controller reads data 608 from those logical addresses. For example, the first zone 602 may be configured to include LBAs 0-1023, and the controller may read 256 KB of data 608 in LBAs 384-895 from first zone 602. Moreover, the controller 123 may identify that the data 608 read at LBAs 384-895 reflect a sequential pattern, and therefore the controller may determine that the host 104 will likely issue a read command for subsequent data 610 in the sequential pattern, for instance at LBAs 896-1919. Therefore, the controller may determine to perform maximum-size RLA based on available resources in the storage device 102 (e.g. 512 KB of subsequent data 610), as illustrated in FIG. 6. Thus, in addition to fetching the data 608 in response to the read command, the controller may pre-fetch the subsequent data 610 and temporarily store that data in the volatile memory 118.

However, when the controller 123 pre-fetches the subsequent data 610 in traditional RLA as described above, the subsequent data may be pre-fetched irrespective of the first zone 602 and second zone 604. For example, the controller may not consider when performing the RLA that the subsequent data 610 happens to be the different zones, or that the host 104 is prohibited from reading across zone boundaries (for instance, the read across zone boundaries flag is reset). Consequently, some of the subsequent data 610 that is pre-fetched in RLA may be thrashed. For example, the host may consider the first zone 602 and second zone 604 to be logically bounded by zone boundary 606 based on the zone configuration, and therefore the host 104 may itself cap its subsequent read command at the zone boundary 606. In other words, the host 104 may not issue a subsequent read command for the entirety of the subsequent data 610, but rather may issue separate read commands for the data in different zones at different times. As a result, since some of the subsequent data 610 that was pre-fetched may not be immediately requested by the host, that data may end up being discarded from cache (e.g. to make room for other pre-fetched data). As a result, the time spent and resources tied up in the NVM 110 during the pre-fetching of subsequent data 610 may be inefficiently used or wasted.

Accordingly, to optimize RLA and reduce the likelihood of thrashing, the controller 123 may limit pre-fetching of subsequent data (e.g. subsequent data 610) based on a zone configuration indicated by the host 104. For example, the controller 123 may receive from the host 104 a zone configuration indicating an association of zones (e.g. zones 502) to groups of sequential, non-contiguous logical addresses (e.g. logical addresses 504), an identify namespace data structure that indicates zone operation characteristics and optional zoned command support, and other information related to ZNS. One of the zone operation characteristics received from the host may include the zone across boundaries flag, which indicates whether the host may read data across zone boundaries 506, 606 (e.g. within the first zone 602 and the second zone 604), and which may be stored in a configuration register in the NVM 110. If the controller determines that the read across zone boundaries flag is reset or otherwise indicates that the host may not read across zone boundaries, the controller may limit RLA if the current read command from the host includes logical addresses within, but not including the end of, a particular zone. For example, referring to FIG. 6, if the controller 123 determines that the data 608 being read in response to the read command in the first zone 602 (e.g. from LBAs 384-895) ends before the zone boundary 606 (as represented by LBA 1023 in this example), then the controller may determine that it will likely receive a subsequent read command for subsequent data 610 within the first zone 602 (e.g. in LBAs 896-1023), but not, in the same command, for subsequent data 610 within the second zone 604 (e.g. in LBAs 1024-2047). As a result, the controller may limit RLA such that the controller only pre-fetches subsequent data 610 until the end of the first zone 602 without entering the second zone 604, notwithstanding whether resources in the storage device 102 are available for additional pre-fetching of data in the second zone. Once the subsequent read command is received requesting the pre-fetched data from the first zone 602 and the controller determines that it will likely receive an additional read command for subsequent data 610 beginning in the second zone 604, the controller may at that time perform RLA without limitation for subsequent data 610 within the second zone 604.

Thus, the controller 123 may optimally use the resources of the storage device 102 by effectively performing a two-stage RLA in situations where reading across zone boundaries is prohibited and the current read command requests data before the end of a current zone. In the first stage of RLA, the controller 123 may immediately trigger RLA for a portion of the subsequent data that is within the same zone as the current read request, while refraining from performing RLA for a remainder of the subsequent data within a different zone as the current read request. Afterwards, if the controller 123 determines that the first stage of RLA is successful (a subsequent read command is received requesting the pre-fetched portion of the subsequent data), the controller may execute the second stage of RLA in which the remainder of the subsequent data within the different zone is pre-fetched. As a result, the resources of the storage device 102 may be optimally used to enable the controller to perform GC or other backend functionalities during the times at which RLA may otherwise have been performed.

Figure 7:
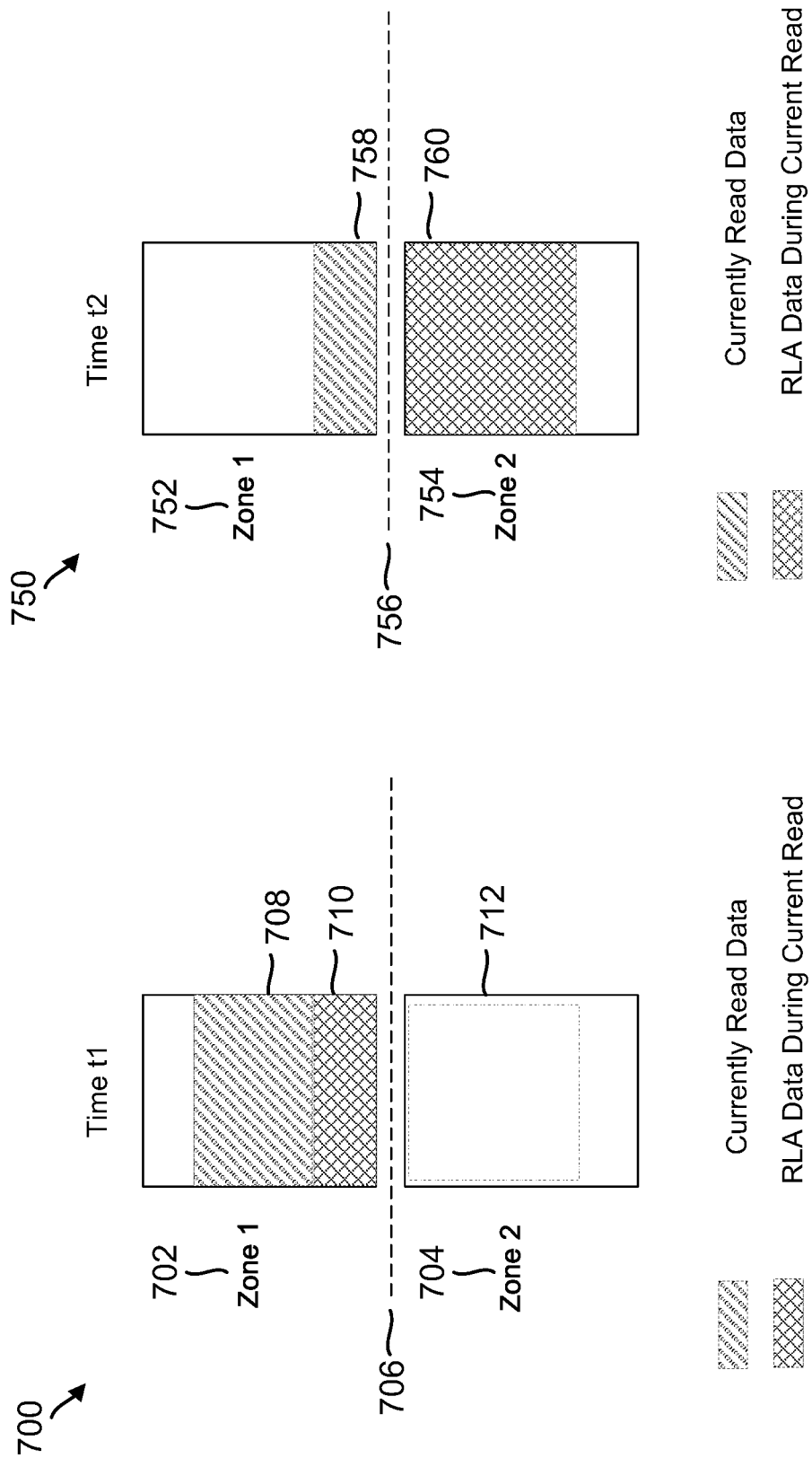
FIG. 7A is a conceptual diagram illustrating an example of optimized read look ahead performance based on zones.
FIG. 7B is a conceptual diagram illustrating an example of optimized read look ahead performance based on zones.

FIGS. 7A and 7B illustrate example diagrams 700, 750 of optimized RLA performance when the NVM 110 is divided into zones, including a first zone 702, 752 and a second zone 704, 754 separated by a zone boundary 706, 756. The optimized RLA may be a two-stage RLA as described above, where FIG. 7A illustrates an example of the first stage of the optimized RLA (performed at time t1) and FIG. 7B illustrates an example of the second stage of the optimized RLA (performed at time t2). First zone 702, 752 and second zone 704, 754 may respectively correspond to the first zone 602 and second zone 604 in FIG. 6, and zone boundary 706, 756 may similarly correspond to zone boundary 606 in FIG. 6.

Referring to FIG. 7A, the controller 123 of the storage device 102 initially receives a read command from host 104 including logical addresses in the first zone 702, and the controller reads data 708 from those logical addresses (e.g. at time t1). For example, the first zone 702 may be configured to include LBAs 0-1023, and the controller may read 256 KB of data 708 in LBAs 384-895 from first zone 702. Moreover, the controller 123 may identify that the data from these logical addresses (e.g. LBAs 384-895) reflect a sequential pattern, and therefore the controller may predict that the host 104 will likely issue a read command for subsequent data 710 in the sequential pattern (for instance subsequent data in LBAs 896-1919). Additionally, the controller may determine based on a zone configuration received from the host 104 that reading across zone boundaries is prohibited (e.g. the read across zone boundaries flag is reset) and that the current read command includes LBAs in the first zone 702 that end before the zone boundary 706 (e.g. LBAs 384-895 which end before LBA 1023, which may be the boundary of the first zone 702).

Accordingly, the controller 123 may predict based on the zone configuration that, as long as the host 104 has not completed a read of a current zone, subsequent read commands from the host will remain within the same zone. For example, in response to receiving the command for LBAs 384-895 in the first zone 702, the controller may predict that the host will likely send a subsequent read command for LBAs 896-1023 in the first zone 702, but will not at the same time for LBAs 1024-1919 in the second zone 704. Therefore, the controller may determine to limit pre-fetching of subsequent data 710 to those LBAs that end at the zone boundary 706 of the first zone 702 (e.g. LBAs 896-1023, or 64 KB of data in this example), without performing RLA of additional data 712 in the second zone 704 (e.g. LBAs 1024-1919).

Referring to FIG. 7B, the controller 123 may later receive a subsequent read command from the host 104 including the logical addresses associated with the pre-fetched data in the first zone 752, and the controller may read the subsequent data 758 from those logical addresses (e.g. at time t2). For example, the subsequent read command may now request the data in LBAs 896-1023 that was previously pre-fetched and stored in the volatile memory 118, and the controller may obtain that subsequent data from the volatile memory to be provided to the host. If the controller 123 determines that the subsequent read command includes the rest of the LBAs in the first zone 752 (i.e. no further read commands will arrive for the first zone), the controller 123 may determine that an additional read command for data in the second zone 754 (e.g. additional data 760) will likely be received from the host. For example, the controller may determine that an additional read command may arrive that now requests data from LBAs 1024-1919, and that this requested data is part of the same sequential pattern as the previously requested data. Accordingly, the controller may perform RLA and pre-fetch the additional data 760 in the second zone 704 as described above.

In one example, the controller 123 may perform RLA for the additional data 760 in the second zone 754 without limiting the pre-fetching based on the zone configuration. For example, the controller may perform unrestricted RLA up to the maximum size available that may be pre-fetched based on available system resources, such as described above with respect to FIG. 6. However, since the additional data 760 starts in a different zone than the previously read data, it is possible the host may not send a read command requesting the entirety of the pre-fetched data from the second zone. For example, the host may decide to send the read command for a portion of the additional data in the second zone, or may even send a read command for additional data in a third zone (not shown). In such case, system resources may still be inefficiently used for RLA.

To address this possibility of inefficient RLA of the additional data 760, the controller 123 may limit pre-fetching of the additional data 760. In one example, the RLA restriction may be static in nature. For example, rather than pre-fetching a maximum amount of data available for RLA (e.g. 512 KB or some other data size), the controller 123 may conservatively pre-fetch a smaller amount of the additional data (e.g. 128 KB or some other data size less than the maximum amount of data available for RLA). In another example, the RLA may be dynamic in nature. For example, rather than pre-fetching the maximum amount of data available for RLA, the controller 123 may determine an amount of the additional data 760 to be pre-fetched based on prior sequential patterns from the host 104 or other historical information. For instance, when performing the two-stage RLA described above for previous read commands, the controller 123 may track the number of successes or failures of the second stage of the RLA and the amount, if any, of additional data that was later requested by the host in the second zone following the second stage of RLA. If the controller determines based on the prior sequential patterns or other historical information that the host tends to request only a portion of the additional data in the second zone, or that the host does not generally request the additional data in the second zone at all, the controller may determine to limit RLA of the additional data to a greater degree, such as by using smaller RLA sizes or preventing RLA. In contrast, if the controller determines based on the prior sequential patterns or other historical information that the host tends to request a larger portion of the additional data in the second zone or even its entirety, the controller may determine to ease RLA restrictions of the additional data or limit RLA to a lesser degree, such as by using larger (or even the maximum) RLA sizes. These approaches allow for additional resources in the storage device 102 to be statically or dynamically withheld from RLA and instead used for background operations in the event that read commands for the entirety of additional data are not received, thus improving the efficiency of the storage device 102.

Thus, for storage devices that implement ZNS, RLA may be optimized such as described in the examples above if reading across zone boundaries is prohibited. On the other hand, if reading across zone boundaries is permitted (e.g. the read across zone boundaries flag is set), then the host 104 may consider the entire logical region of the NVM 110 associated with the zoned namespace as a single space for reads rather than as separate zones. Moreover, storage devices that do not implement ZNS (e.g. non-ZNS devices) may operate similarly to ZNS devices from the perspective of reads when reading across zone boundaries is permitted. In such devices, the controller may perform RLA in one example based on the internal resource availability of the storage device. For example, the controller may trigger RLA when the storage device has low command queue depths and when existing backend work is less than what the system can actually support.

Alternatively, in another example, the controller 123 of such devices (e.g. non-ZNS devices and ZNS devices configured to permit reading across zone boundaries) may not perform traditional RLA as described with respect to FIG. 6, but may instead perform a simulated version of the optimized RLA described above with respect to FIGS. 7A and 7B. More particularly, in such devices, the controller may limit the pre-fetching of data in RLA based on stored metadata indicating a sequential host write pattern. For example, the controller 123 may determine from a submission queue of write commands received from the host 104 that a sequential pattern exists in an initial write command and a subsequent write command, and the controller may store metadata indicating the LBAs, data length, and other information associated with the subsequent write command in the NVM 110 along with the data in the initial write command (for example, by tagging the metadata in a FMU header of a portion of the written sequential data for the initial write command). When the controller later performs a sequential read of this data in response to a read command, the controller may read and analyze the metadata to determine whether RLA is to be performed, and if so, the amount of data to be pre-fetched during RLA. The controller may limit the amount of data to be pre-fetched during RLA based on the stored metadata. Thus, similar to the approach described with respect to FIGS. 7A and 7B, the host may indicate boundaries to the controller to cap or limit RLA (via the metadata determined by the controller), even in non-ZNS devices without zone boundaries or ZNS devices that may read across zone boundaries, and thus RLA may be further optimized as a result. Moreover, by performing RLA based on configurations or metadata as described above, the controller may identify boundaries for limiting RLA more confidently in line with sequential host patterns, and thus achieve a higher rate of successful predictions for RLA, than in other approaches that may rely on less confident controller-created boundaries (e.g. boundaries identified where new L2P address translation tables are created or other device-specific situations not relying on host-provided configurations).

In one example, when the controller receives sequential write commands in a submission queue, the controller may identify information from the submission queue indicating whether a sequential pattern of data being written from the host is continuing (in a different write command) or ends (at the current write command). For example, if an initial write command in the submission queue includes LBAs 384-895 associated with 256 KB of sequential data and a subsequent write command in the submission queue includes LBAs 896-1023, the controller may determine that the sequential pattern continues from the initial write command to the subsequent write command, and thus the controller may identify and store this information regarding the sequential pattern as metadata associated with the initial write command. For example, when the controller writes the host data in the initial write command into the NVM 110, the controller may also store the LBAs, data length, or other information regarding the subsequent write command as metadata associated with the initial write command. For instance, the controller may tag the metadata in a FMU header associated with a last portion of the data in the initial write command (prior to flushing the data into the non-volatile memory), the controller may save the metadata in a table or other data structure in the NVM 110, or the controller may store the metadata in other ways. As a result, when the controller later receives a sequential read command for the data, the controller may read this metadata along with the sequential data to determine whether and how much RLA or pre-fetching of subsequent data will be required. For example, if the read command includes LBAs 384-895 associated with 256 KB of sequential data and the metadata indicates that the sequential pattern continues for LBAs 896-1023, the controller may limit pre-fetching of data to LBAs 896-1023 (e.g. 64 KB) based on the metadata, even if the maximum amount of data that may be pre-fetched in RLA is larger (e.g. 512 KB) based on available resources in the storage device. Alternatively, if the metadata indicates that a sequential pattern ends (e.g. the next LBAs are not sequential to the current read command), the controller may not perform RLA, saving time and resources for other background operations such as GC.

This approach may also be applied when the controller 123 is processing multiple read streams. For example, the controller may receive multiple read commands from the controller to read sequential data in different ranges of LBAs in parallel (or nearly parallel). In such case, the controller may operate similarly to a single read stream by reading the metadata of each stream and limiting RLA based on the metadata for each stream. For instance, the controller may receive a read command including LBAs 384-895 associated with 256 KB of sequential data to be processed in a first read stream and another read command including LBAs 10384-10895 associated with 256 KB of other sequential data to be processed in a second read stream. In example, if the metadata for the first read stream indicates that the sequential pattern continues for LBAs 896-1023, and the metadata for the second read stream indicates that the sequential pattern continues for LBAs 10896-11023, the controller may limit pre-fetching of data to LBAs 896-1023 (e.g. 64 KB) based on the metadata in the first read stream and similarly limit pre-fetching of data to LBAs 10896-11023 (e.g. 64 KB) based on the metadata in the second read stream. Thus, RLA may be further optimized for multiple read streams.

The above-described approach for optimizing RLA based on stored metadata (whether single or multiple read streams) assumes that the host reads the data in approximately the same fashion as the data was written to the NVM 110. For example, if the host writes data in a sequential pattern including 256 KB of data followed by 64 KB of data, this approach assumes that the host reads data in a similar sequential pattern of 256 KB followed by 64 KB. Although it is likely that the host may write and read in similar sequential patterns, this approach may nevertheless result in too much or too little RLA in the unlikely event that the host does not write and read in such similar manner. Therefore, other optimizations to RLA, such as dynamically restricting RLA based on prior sequential patterns or other historical information as described above, may likewise be considered to reduce the risk of insufficient (or extra-sufficient) RLA. Moreover, even if insufficient or extra-sufficient RLA still happens to occur, such occurrence would not cause functionality failures to the storage device in any event.

Figure 8:
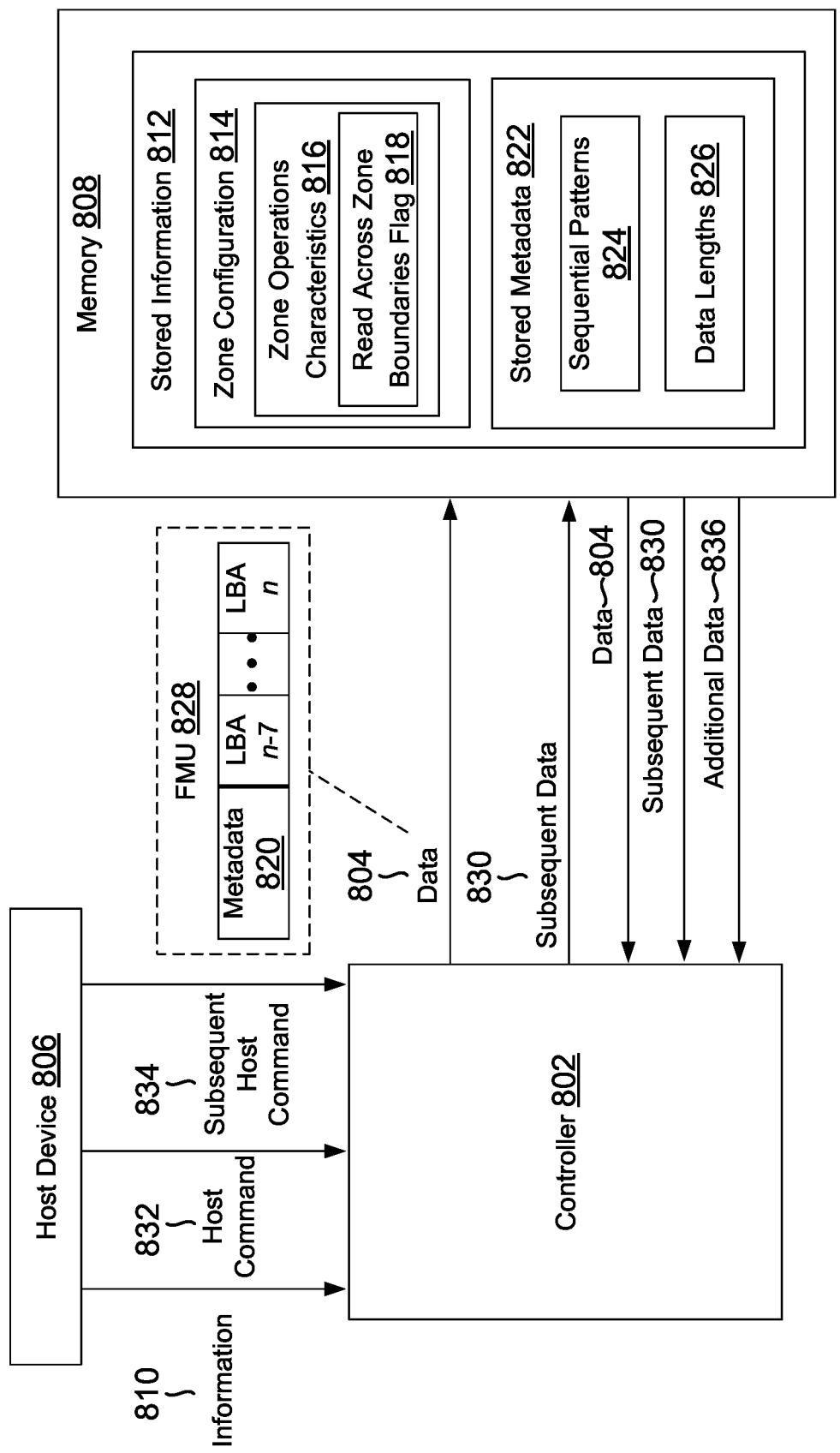
FIG. 8 is a conceptual diagram illustrating an example of a controller of the storage device of FIG. 1 that performs read handling using optimized read look ahead.

FIG. 8 illustrates an example diagram 800 of a controller 802 of a storage device that performs optimized RLA of data 804 in response to read commands from a host device 806. For example, controller 802 may correspond to controller 123 of the storage device 102 of FIG. 1, host device 806 may correspond to host 104 in FIG. 1, and data 804 may correspond to data 119 of FIG. 1. The controller writes and reads data 804 in a memory 808, which may correspond to the NVM 110 of FIG. 1. The controller 802 and memory 808 may be within a ZNS device or a non-ZNS device.

The host device 806 may provide information 810 to the controller 802 which the controller may store in the memory 808 (e.g. as stored information 812). In one example, the information 810 may include a zone configuration 814 indicating an association of zones (e.g. zones 502 in FIG. 5) to groups of sequential, non-contiguous logical addresses (e.g. logical addresses 504 in FIG. 5), an identify namespace data structure that indicates zone operation characteristics 816 and optional zoned command support, and other information related to ZNS. One of the zone operation characteristics 816 may include a zone across zone boundaries flag 818 indicating whether the host device 806 may read data across zone boundaries (e.g. zone boundaries 506, 606, 706, 756 in FIGS. 5, 6, 7A and 7B). In another example, the information 810 may include submission queue entries indicating LBAs, data length, and other information associated with write commands, and the controller may determine from information 810 whether a sequential pattern in a write command continues (or ends) in a subsequent write command. If the information indicates a subsequent write command follows an initial write command in a sequential pattern, the controller may store the LBAs, data lengths, or other information associated with the subsequent write command as metadata 820 associated with the initial write command. The controller may also store metadata 820 over time (e.g. as stored metadata 822) as such information is determined for different write commands. Thus, the stored metadata 822 may include information regarding sequential patterns 824 and data lengths 826 associated with various write commands.

Initially, the controller 802 may receive from the host device 806 a write command including data 804, and the controller 802 may write the data 804 into the memory 808 in multiple FMUs 828. Each FMU 828 may include a portion of the data 804, for instance, 8 sectors or LBAs (n-7 to n), where n represents the latest LBA in the current data portion. For example, assuming each LBA represents 512 bytes and each FMU includes eight LBAs, each FMU may represent a 4 KB-size portion of the data 804. When the controller determines metadata 820 (e.g. from information 810), the controller may store the metadata 820 in the memory 808 by tagging the metadata 820 in one of the FMUs 828 (e.g. a last FMU or portion in the multiple FMUs or portions of the data 804), as illustrated in FIG. 8. Alternatively, the controller may store the metadata 820 in the memory 808 in other ways. The metadata 820 may indicate information regarding whether a sequential pattern continues with subsequent data 830 in a subsequent write command. In such case, the controller 802 may receive from the host 104 the subsequent write command including the subsequent data 830, and the controller may similarly write the subsequent data 830 to the memory 808 in multiple FMUs. If the controller similarly determines that the sequential pattern continues with additional data in an additional write command, the controller may store metadata 820 indicating this pattern as well, and the process may repeat for various write commands.

After writing data 804 and subsequent data 830 to the memory 808, the controller 802 may receive a host command 832 requesting to read the data 804 (e.g. data 708 in FIG. 7A). In one example, the information 810 may include the zone configuration 814 (e.g. the storage device is a ZNS device), and the host command 832 may request to read data in a first zone (e.g. first zone 602, 702 in FIGS. 6 and 7A). In such case, the controller 802 may check whether the read across zone boundaries flag 818 stored in the memory 808 is reset or otherwise indicates that the host may not read across zone boundaries. If the host device 806 cannot read across zone boundaries, the controller may determine whether the data 804 being requested is in logical addresses within, but not including the end of, the first zone. If so, the controller 802 may determine that the subsequent data 830 which is sequential to data 804 (e.g. subsequent data 710, 758 in FIGS. 7A and 7B), may be within both the first zone (e.g. first zone 602, 702, 752 in FIGS. 6 and 7A-7B) and the second zone (e.g. second zone 604, 704, 754 in FIGS. 6 and 7A-7B), and the controller may fetch the data 804 from the first zone and limit RLA or pre-fetching of the subsequent data 830 to the end of the first zone. When the controller 802 later receives a subsequent host command 834 for the subsequent data 830 that was previously pre-fetched, the controller may pre-fetch additional data 836 (e.g. additional data 712, 760 in FIGS. 7A-7B, which may correspond to the remainder of the subsequent data within the second zone 704, 754) using RLA in advance of receiving an additional host command for the additional data. The controller may perform RLA for the additional data 836 without limiting pre-fetching, or the controller may perform RLA for the additional data 836 with limited pre-fetching (e.g. static or dynamic in nature). For example, the controller may dynamically limit RLA based on the sequential patterns 824, data lengths 826, or other historical information from prior host commands.

In another example, the controller may determine metadata 820 from the information 810 (e.g. the storage device is a non-ZNS device, or a ZNS device that permits reading across zone boundaries). In such case, after the controller 802 receives a host command 832 requesting to read the data 804, the controller may determine whether to perform RLA and to what size based on the metadata 820. For example, the controller may read the stored metadata 822 along with data 804, and the controller may determine from the metadata that subsequent data 830 continues a sequential pattern from data 804. In such case, the controller may limit pre-fetching in RLA to the amount of the subsequent data 830 that was indicated in the metadata, notwithstanding whether additional resources are available for pre-fetching additional data 836 in RLA at the same time. The controller 802 may perform RLA similarly when processing multiple read streams.

Figure 9:
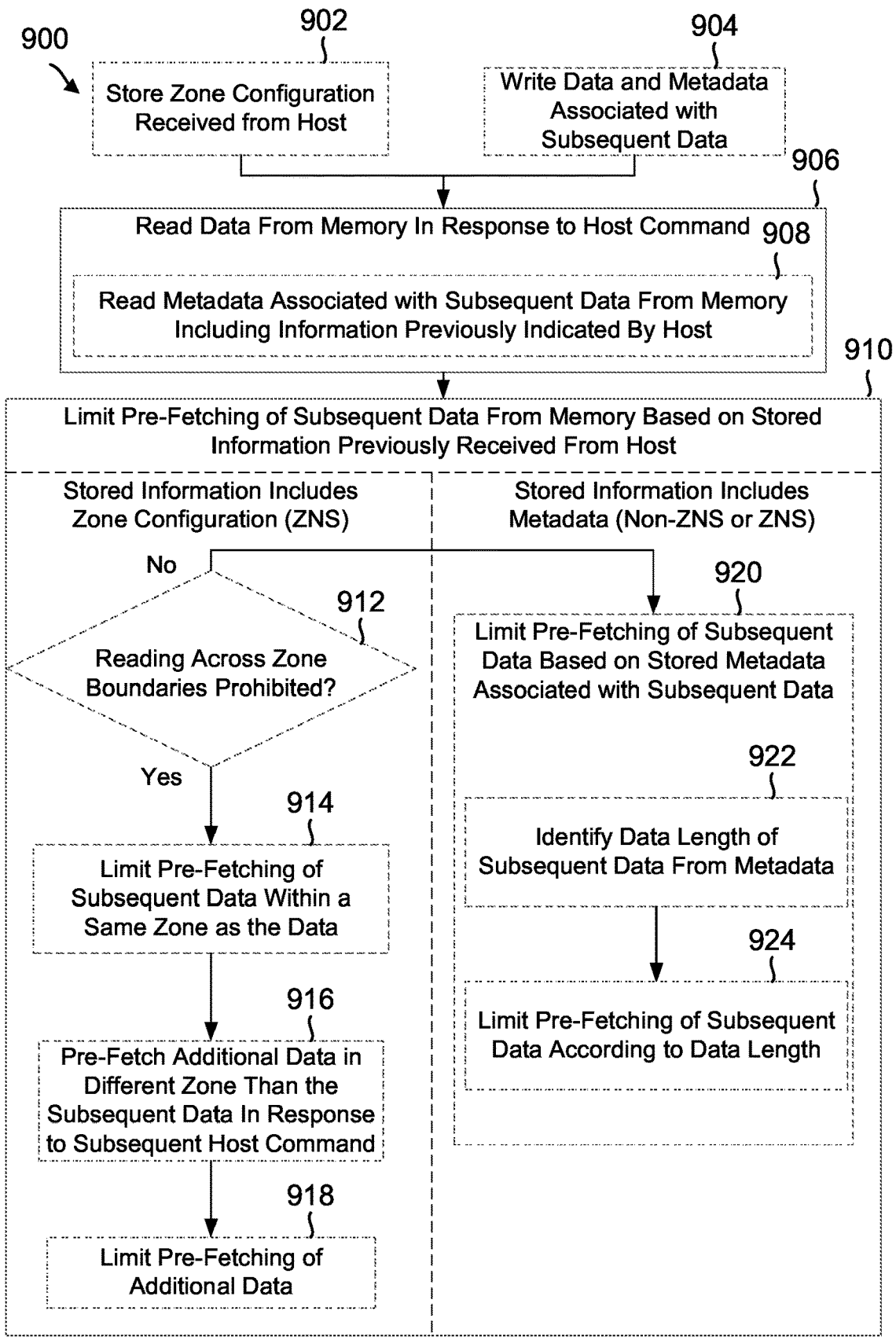
FIG. 9 is a flow chart illustrating a method for read handling, as performed by the storage device of FIG. 1.

FIG. 9 illustrates an example flow chart 900 of a method for read handling using optimized RLA. For example, the method can be carried out in a storage device 102 such as the one illustrated in FIG. 1. Each of the steps in the flow chart can be controlled using the controller as described below (e.g. controller 123, 802), or by some other suitable means.

In one example, as represented by block 902, the controller may store in a memory a zone configuration received from a host. For example, referring to FIG. 8, the controller 802 may store in memory 808 a zone configuration 814 received from host device 806. The zone configuration 814 may include a zone operations characteristic 816 including a read across zone boundaries flag 818. The zone configuration 814 may also indicate that reading across zone boundaries (e.g. zone boundaries 506, 606, 706, 756 in FIGS. 5-7B) is prohibited when the read across zone boundaries flag 818 is reset, and that reading across zone boundaries is permitted when the read across zone boundaries flag 818 is set.

In another example, as represented by block 904, the controller may write data and metadata associated with subsequent data. For example, referring to FIG. 8, the controller 802 may write data 804 and metadata 820 associated with subsequent data 830 in memory 808. The metadata 820 may indicate that the subsequent data 830 and data 804 are part of a sequential pattern 824. The controller 802 may also write the metadata 820 associated with the subsequent data 830 in a FMU header (e.g. in FMU 828) associated with a portion of the data 804 (e.g. a last portion of the data indicated by LBAs n-7 to n).

As represented by block 906, the controller may read data from memory in response to a host command. For example, referring to FIG. 8, the controller 802 may read data 804 from memory 808 in response to host command 832. Moreover, as represented by block 908, the controller may read metadata associated with subsequent data from memory including information previously indicated by the host. For example, referring to FIG. 8, the controller 802 may read stored metadata 822 associated with subsequent data 830 from memory 808 including information previously indicated by the host device 806 (e.g. information 810 such as LBAs or other information associated with the subsequent data that is indicated in metadata 820). The metadata 820 may also include a data length 826 of the subsequent data 830.

As represented by block 910, the controller may limit pre-fetching of subsequent data from memory based on stored information previously received from the host. For example, referring to FIG. 8, the controller 802 may limit pre-fetching of subsequent data 830 from memory 808 based on stored information 812 previously received from host device 806 (e.g. information 810 including zone configuration 814, or information 810 such as LBAs, data length, or other information determined as metadata 820). The stored information may include the zone configuration 814 received from host device 806, metadata 820 indicating that subsequent data 830 and data 804 are part of a sequential pattern 824, or both.

The limiting may correspond to the first stage of optimized RLA such as described above with respect to FIG. 7A. For instance, when the stored information includes a zone configuration, then as represented by block 912, the controller may determine whether reading across zone boundaries is prohibited. For example, referring to FIG. 8, the controller 802 may determine whether the read across zone boundaries flag 818 is reset in the zone operations characteristics 816 of the zone configuration 814. If so, then as represented by block 914, the controller may limit pre-fetching of subsequent data within a same zone as the data. For example, referring to FIG. 8, the controller 802 may limit pre-fetching of subsequent data 830 within a same zone as data 804. For instance, referring to FIG. 7A, when the controller reads data 708 from the first zone 702, the controller may only pre-fetch subsequent data 710 until the end of the first zone 702.

The controller may then perform the second stage of optimized RLA such as described above with respect to FIG. 7B. For instance, as represented by block 916, the controller may pre-fetch additional data in a different zone than the subsequent data in response to a subsequent host command. For example, referring to FIG. 8, the controller 802 may pre-fetch additional data 836 in a different zone than the subsequent data 830 in response to subsequent host command 834. For instance, referring to FIG. 7B, when the controller reads subsequent data 758 from the first zone 702, the controller may pre-fetch additional data 760 from the second zone 754.

Furthermore, as represented by block 918, the controller may limit pre-fetching of the additional data. For example, referring to FIGS. 7B and 8, the controller 802 may limit pre-fetching of additional data 760, 836 from the second zone 754. For instance, the controller may perform RLA for the additional data 760, 836 with limited pre-fetching (e.g. static or dynamic in nature) as described above. In one example, the RLA restriction may be static in nature. For example, rather than pre-fetching a maximum amount of data available for RLA (e.g. 512 KB or some other data size), the controller 123 may conservatively pre-fetch a smaller amount of the additional data (e.g. 128 KB or some other data size less than the maximum amount of data available for RLA). In another example, the RLA may be dynamic in nature. For example, rather than pre-fetching the maximum amount of data available for RLA, the controller 123 may determine an amount of the additional data 760 to be pre-fetched based on prior sequential patterns (e.g. sequential patterns 824) from the host device 806 or other historical information.

Alternatively, when the controller determines at block 912 that reading across zone boundaries is permitted, or when the stored information includes metadata, then as represented by block 920, the controller may limit pre-fetching of subsequent data based on stored metadata associated with the subsequent data. For instance, referring to FIG. 8, the controller 802 may limit pre-fetching of subsequent data 830 based on the stored metadata 822 associated with the subsequent data 830 by performing the simulated version of the optimized RLA described above with respect to FIGS. 7A and 7B. For example, as represented by block 922, the controller may identify a data length of the subsequent data from the metadata, and as represented by block 924, the controller may limit pre-fetching of the subsequent data according to the data length. For instance, referring to FIG. 8, after the controller 802 writes the metadata 820 associated with the subsequent data 830 in a FMU header (e.g. in FMU 828) associated with a portion of the data 804, the controller 802 may read the metadata 820 tagged in the FMU 828 to identify a data length 826 of the subsequent data 830 from the metadata 820, and the controller 802 may limit pre-fetching of the subsequent data 830 according to the data length 826. For example, if the metadata 820 indicates that the subsequent data 830 included only 64 KB of data, the controller may pre-fetch 64 KB of data rather than the maximum size available for RLA (e.g. 512 KB).

Accordingly, the storage device described in the present disclosure provides an optimized sequential read policy for ZNS devices that are configured to prohibit reading across zone boundaries. By limiting the pre-fetching of data in RLA based on zone configurations indicated by a host device, a higher likelihood of successful RLA predictions may be made. Moreover, this effect may be simulated for non-ZNS devices, as well as for ZNS devices that are configured to permit reading across zone boundaries, by allowing for data pre-fetched in RLA to be similarly limited based on stored metadata indicated by the host device. As a result of these optimizations to RLA, resource usage of the storage device may be improved and background operations such as GC may be more efficiently performed.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
memory; and
a controller configured to read data from the memory in response to a host command, and to limit pre-fetching of subsequent data from the memory based on stored information previously received from a host, wherein the stored information comprises:
a zone configuration received from the host, or
metadata indicating that the subsequent data and the data are part of a sequential pattern of logical addresses.

2. The storage device of claim 1, wherein the stored information comprises the zone configuration, and the controller is further configured to limit the pre-fetching of the subsequent data within a same zone as the data when the zone configuration indicates that reading across zone boundaries is prohibited.

3. The storage device of claim 2, wherein the controller is further configured to pre-fetch additional data in a different zone than the subsequent data in response to a subsequent host command for the subsequent data.

4. The storage device of claim 3, wherein the controller is further configured to limit the pre-fetching of the additional data.

5. The storage device of claim 1, wherein the stored information comprises the zone configuration, and the controller is further configured to limit the pre-fetching of the subsequent data based on stored metadata associated with the subsequent data when the zone configuration indicates that reading across zone boundaries is permitted.

6. The storage device of claim 1, wherein the stored information comprises the metadata, and the controller is further configured to identify a data length of the subsequent data from the metadata, and to limit the pre-fetching of the subsequent data according to the data length.

7. A storage device, comprising:
memory; and
a controller configured to store in the memory a zone configuration received from a host, to read data from the memory in response to a host command, and to limit pre-fetching of subsequent data from the memory based on the zone configuration.

8. The storage device of claim 7, wherein the zone configuration comprises a zone operations characteristic including a read across zone boundaries flag.

9. The storage device of claim 8, wherein the zone configuration indicates that reading across zone boundaries is prohibited when the read across zone boundaries flag is reset, and wherein the zone configuration indicates that reading across zone boundaries is permitted when the read across zone boundaries flag is set.

10. The storage device of claim 7, wherein the controller is further configured to limit the pre-fetching of the subsequent data within a same zone as the data when the zone configuration indicates that a read across zone boundaries flag is reset.

11. The storage device of claim 10, wherein the controller is further configured to pre-fetch additional data in a different zone than the subsequent data after receiving a subsequent host command for the subsequent data.

12. The storage device of claim 11, wherein the controller is further configured to limit the pre-fetching of the additional data based on a prior sequential pattern of host commands.

13. The storage device of claim 7, wherein the controller is further configured to limit the pre-fetching of the subsequent data based on stored metadata associated with the subsequent data when the zone configuration indicates that a read across zone boundaries flag is set.

14. A storage device, comprising:
memory; and
a controller configured to read data from the memory in response to a host command, to read metadata associated with subsequent data from the memory including information previously indicated by a host, and to limit pre-fetching the subsequent data from the memory based on the information, wherein the metadata indicates that the subsequent data and the data are part of a sequential pattern of logical addresses.

15. The storage device of claim 14, wherein the information includes a data length of the subsequent data.

16. The storage device of claim 14, wherein the controller is further configured to write the metadata in a flash management unit (FMU) header associated with a portion of the data.

17. The storage device of claim 16, wherein the controller is further configured to identify a data length of the subsequent data from the metadata in the FMU header, and to limit the pre-fetching of the subsequent data according to the data length.

* * * * *